(12) United States Patent
Hartmann

(10) Patent No.: US 8,167,768 B2
(45) Date of Patent: May 1, 2012

(54) EIGHT SPEED CHAINLESS DRIVE FOR A PEDAL POWERED UTILITY TRICYCLE

(76) Inventor: Dirck Ten Broeck Hartmann, Hunt. Bch, CA (US)

( * ) Notice: Subject to any disclaimer, the term of this patent is extended or adjusted under 35 U.S.C. 154(b) by 982 days.

(21) Appl. No.: 12/229,100

(22) Filed: Jun. 23, 2008

(65) Prior Publication Data
US 2009/0255356 A1    Oct. 15, 2009

(51) Int. Cl.
*F16H 3/44* (2006.01)
(52) U.S. Cl. .......................................... 475/296; 74/331
(58) Field of Classification Search ............ 74/325, 74/331, 332, 335; 475/296, 311, 313, 329, 475/330
See application file for complete search history.

(56) References Cited

U.S. PATENT DOCUMENTS

| | | | | | |
|---|---|---|---|---|---|
| 4,706,982 | A | * | 11/1987 | Hartmann | 280/238 |
| 4,842,291 | A | * | 6/1989 | Hartmann | 280/238 |
| 2009/0039613 | A1 | * | 2/2009 | Hartmann | 280/261 |
| 2009/0278330 | A1 | * | 11/2009 | Hartmann | 280/202 |

* cited by examiner

*Primary Examiner* — Justin Holmes

(57) ABSTRACT

An improved eight speed chainless drive includes a gear case housed within the hub of the driving wheel of a utility tricycle with a drive shaft on the axis of the wheel. Three counter shafts rotatably mounted on ball bearings in the gear case are equally spaced around the drive shaft with six gears fixed on each counter shaft. The two gears on one end of each counter shaft are in constant mesh with two drive gears which can be selectively locked to the drive shaft, and the four gears on the other end are in constant mesh with four gears rotating freely on a driven gear carrier rotatably mounted on a ball bearing on the drive shaft, with provisions for selectively locking any one of the four to the driven gear carrier. Spring-loaded pawls mounted on steel pins in the end of the driven gear carrier engage a ratchet ring fixed in the wheel hub for driving the wheel.

5 Claims, 6 Drawing Sheets

EIGHT SPEED CHAINLESS DRIVE FOR A PEDAL POWERED UTILITY TRICYCLE

BACKGROUND OF THE INVENTION

1. Field of the Invention

This invention relates generally to multiple speed transmissions for bicycles and tricycles and more particularly to tricycle drives of the chainless type.

2. Description of the Prior Art

Typical gym equipment includes stationary bicycles, ellipticycles, and various steppers and stair climbers. An object of this invention is to provide the conditioning function of typical gym equipment in a durable, low maintenance tricycle that can be ridden with a conventional bicycle seat and pedals like a stationary bicycle, or with torque amplifying pedal beams like an ellipticycle, and is easily convertible between these two options.

SUMMARY OF THE INVENTION

The eight speed transmission of this invention includes a gear case located inside the hub of the tricycle driving wheel with an integral cylindrical extension of the gear case extending outboard of the wheel hub on one side and fixed by the tricycle frame; a drive shaft on the axis of the wheel; three counter shafts mounted parallel to the drive shaft on ball bearings in the gear case with six gears fixed on each counter shaft; two drive gears rotating freely on the drive shaft and in constant mesh with the two end gears on each counter shaft with a means for selectively locking one or the other of the drive gears to the drive shaft; a driven gear carrier rotating freely in a fixed axial position on the drive shaft; four gears rotating freely on the driven gear carrier with each in constant mesh with a gear on each of the three counter shafts with a means for selectively locking any one of the four to the driven gear carrier; and a conventional one way clutch driving the wheel hub from the driven gear carrier. The transmission provides speeds one through four with the smaller drive gear locked to the drive shaft by sequentially locking the four gears rotating freely on the driven gear carrier to the driven gear carrier, and speeds five through eight with the larger drive gear locked to the drive shaft by sequentially locking the four gears on the driven gear carrier to the carrier.

The means for locking one or the other of the drive gears to the drive shaft includes two orthogonally located slots through the drive shaft with the length of the slots equal to the travel required by the locking means; a hole through the center of the drive shaft with a guide bushing threaded into each end of the hole; multiple teeth cut in the bore of each drive gear with the length of the teeth equal to half the face width of the gear; a bar with a width equal to the length of the teeth in the drive gear bore and a tooth form on each end sliding in each of the orthogonal slots with the bars notched at their center so that they both are in the same plane; a compression spring in the hole through the center of the drive shaft between the orthogonal bars and the guide bushing; a drive gear selector rod with a reduced diameter end of the rod passing through the center of one orthogonal bar and threaded into the center of the other clamping the two orthogonal bars together; and a small pitch chain passing out through the guide bushing in the end of the drive shaft and connecting the drive gear selector rod with a shift rod located outside the transmission.

A crank arm is mounted with a close slip fit on both ends of the drive shaft and clamped in place with bolts threaded into opposite sides of the crank arm with a reduced diameter end of each bolt an interference fit in both the end of the hole in the crank arm and the shallow flat bottomed matching hole in the drive shaft. The threaded portion of the bolt serves as both a pin driver and a pin puller for easy exchange of crank arms.

A conventional bicycle pedal is threaded into one end of the crank arm with an integral extension of the crank arm on the other end with a slot and a notch for engaging one or the other of two roll pins in the shift rod. When a roll pin is positioned in the notch the orthogonal bars are in alignment with the teeth in the bore of one or the other of the two drive gears.

The means for selectively locking any one of the four gears rotating freely on the driven gear carrier to the carrier includes two axial slots extending in from the clutch end of the carrier and a driven gear selector ring with a tooth form extending out through the slots for engaging internal teeth in the bore of a driven gear. The radial leg of a ring with the cross section of an angle is a located on one side of the selector ring with the longitudinal leg passing through the bore of the selector ring, and a ring with a rectangular cross section is located on the other side. A driven gear selector rod with an expanded diameter on the inboard end is located in the hole through the center of the drive shaft. A transverse pin extends across the diameter of the rectangular ring passing through the longitudinal leg of the angle ring, a longitudinal slot in the drive shaft, and a hole through the driven gear selector rod, and is locked in position by a set screw in the end of the selector rod. A compression spring is located between the expanded diameter end of the selector rod and the guide bushing in the end of the drive shaft. A small pitch chain passes out through the guide bushing and connects the selector rod with a shift rod with four roll pins through it. Identical crank arms are used on both sides of the transmission.

DESCRIPTION OF THE PREFERRED EMBODIMENT

Figure 3:
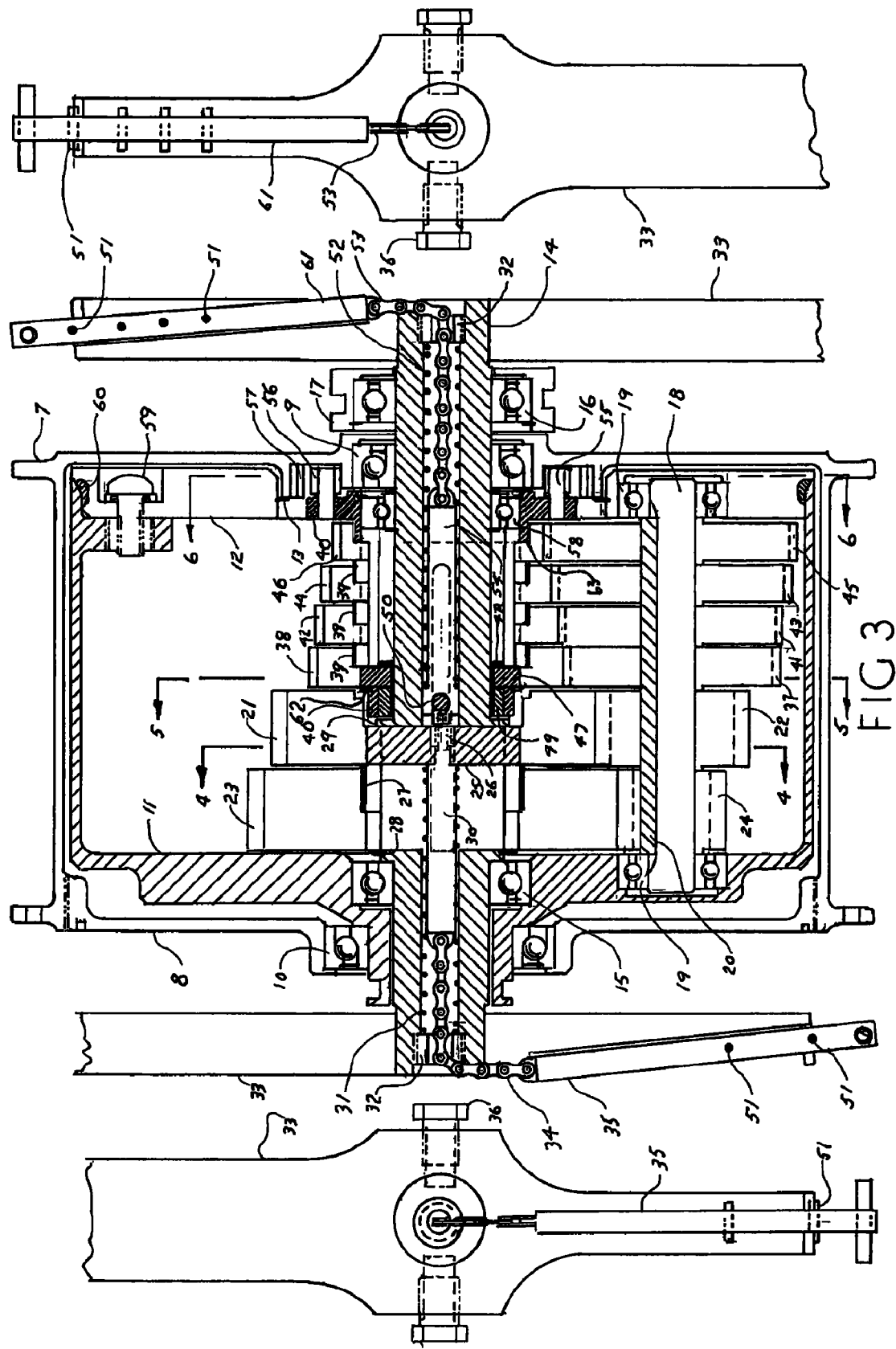
FIG. 3 is a sectional view taken along the line 3-3 of FIG. 2 with partial end views to show the crank arms and provisions for shifting gears.

Referring to FIG. 3, the transmission in accordance with the present invention includes a wheel hub 7, a wheel hub closing plate 8, a gear case 11, a gear case closing plate 12, and a drive shaft 14. The wheel hub 7 is centered on the drive shaft 14 by the angular contact ball bearing 9. The gear case is centered on the drive shaft 14 by the ball bearing 15. The wheel hub closing plate 8 is centered by the angular contact ball bearing 10 which is seated on a cylindrical extension of the gear case 11. The cylindrical extension of the gear case 11 is clamped in the tricycle frame preventing the gear case from rotating. The transmission is shown removed from the tricycle frame for clarity of depiction.

Figure 4:
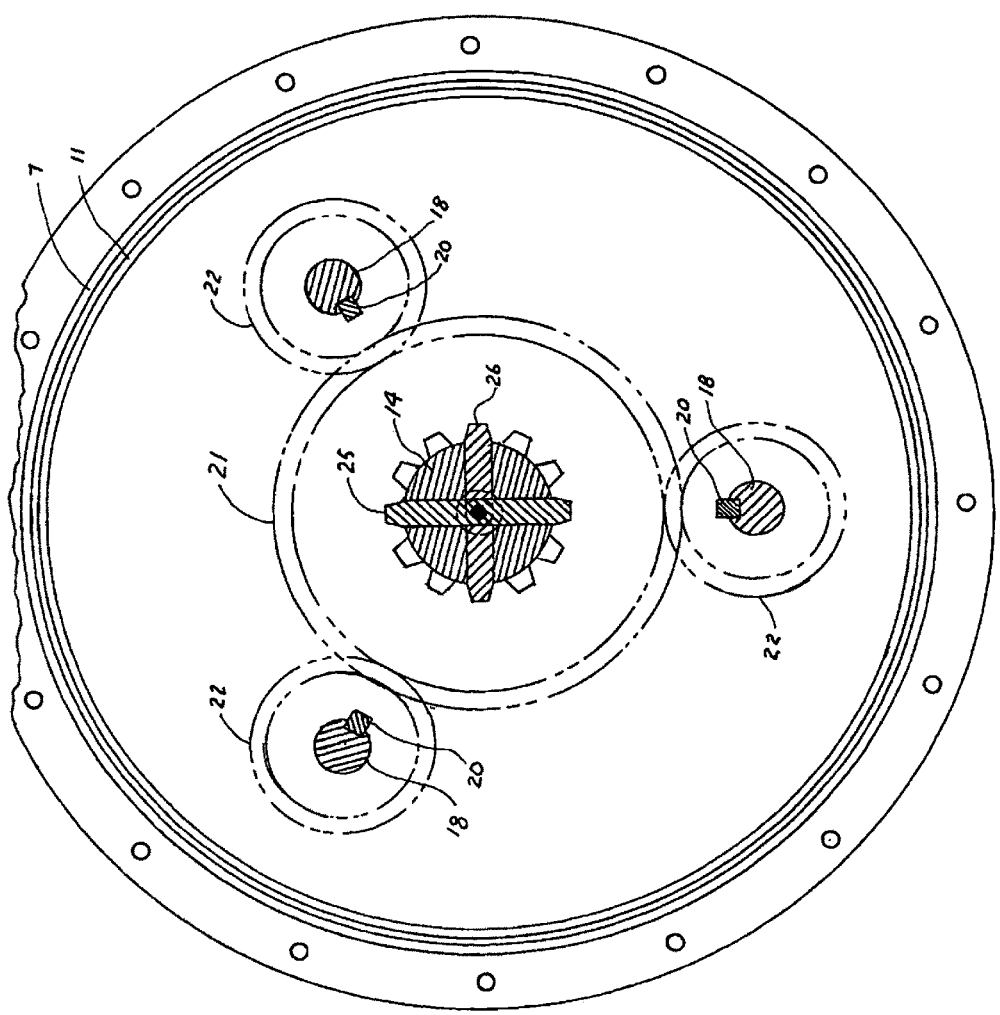
FIG. 4 is a section taken along the line 4-4 of FIG. 2

Referring to FIGS. 3 and 4, three counter shafts 18 are mounted parallel to the drive shaft 14 on ball bearings 19 in the gear case 11 and in the gear case closing plate 12. Six gears mounted adjacent to each other on the counter shaft 18 are forced to rotate at the speed of the counter shaft by the key 20 with a length equal to the distance between the bearings 19. The end gear 24 on each counter shaft 18 is in constant mesh with the larger drive gear 23 on the drive shaft 14, and the adjacent gear 22 on each counter shaft 18 is in constant mesh with the smaller drive gear 21 on the drive shaft 14. A bar 25 and a bar 26, each with a tooth form on both ends, slide in orthogonally located slots through the drive shaft 14. The bars 25 and 26 are notched halfway through their width at the center so when nested together they lie in the same plane. As shown in FIG. 4, the ends of the bars 25 and 26 engage a tooth form machined in the bore of the drive gear 21.

Referring to FIG. 3, a hole is located in the center of the bar 25 with a threaded hole in the center of the bar 26. A drive gear selector rod 30 is located in a hole bored through the center of the drive shaft 14. The drive gear selector rod 30 has a reduced diameter threaded end which is screwed into the bar 26 clamping it to the bar 25. A guide bushing 32 is threaded into both ends of the drive shaft 14. A compression spring 31 is installed between the guide bushing 32 and the bars 25 and 26.

Referring to FIG. 3, a pedal crank arm 33 is located on both ends of the drive shaft 14 and locked in place with a pair of bolts 36 which transfer torque to the drive shaft. A small pitch chain 34 connects the drive gear selector rod 30 with the gear shift rod 35. Two roll pins 51 are spaced so when the end roll pin is placed in a groove in the end of an integral extension of the crank arm 33, the bars 25 and 26 are located in the position shown in FIG. 3, where the drive shaft drives the smaller drive gear 21. If the gear shift rod 35 is moved so that the second roll pin is positioned in the groove in the end of the integral extension of the crank arm 33, the bars 25 and 26 are positioned so the drive shaft 14 drives the larger gear 23. The axial position of the drive gears 21 and 23 on the drive shaft 14 is maintained by a snap ring 28, an integral shoulder 29, and a spacer sleeve 27 with an inside diameter large enough to clear the ends of bars 25 and 26.

Figure 5:
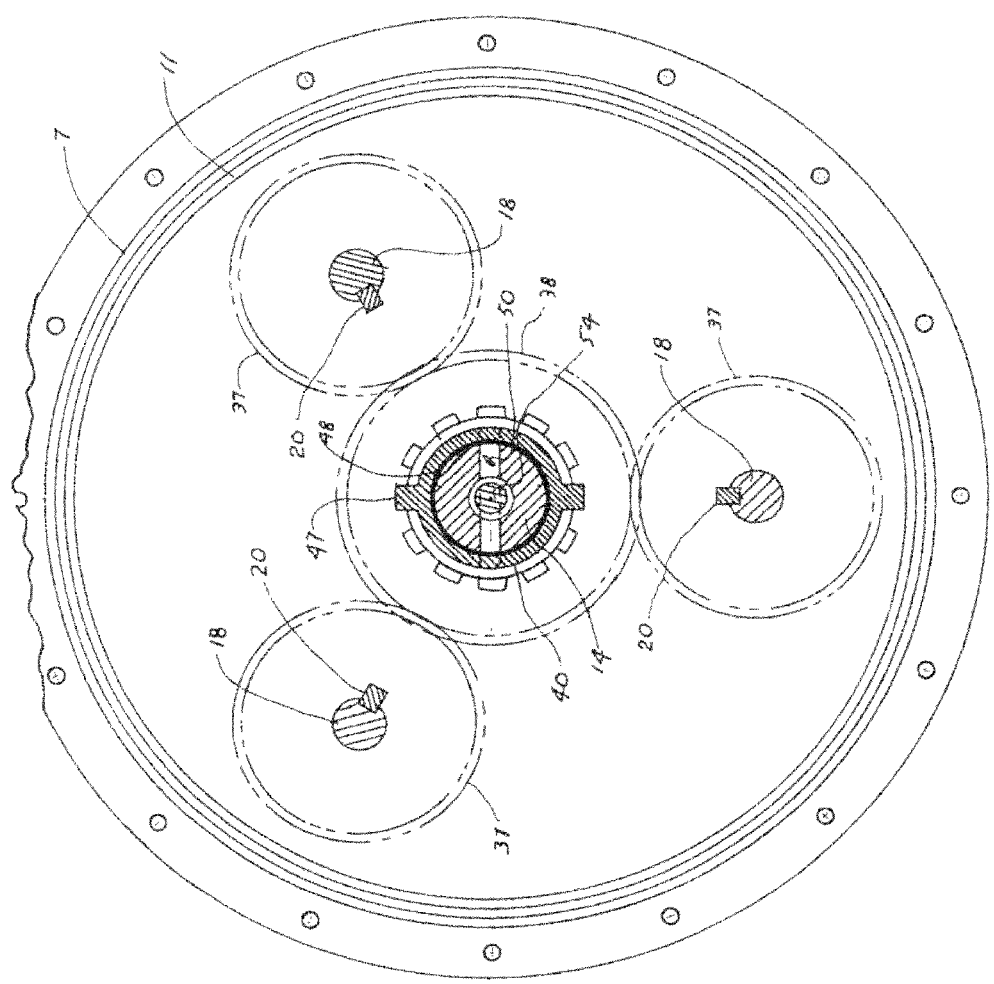
FIG. 5 is a section taken along the line 5-5 of FIG. 2

Referring FIG. 3 and to FIG. 5, a driven gear carrier 40 is mounted on a ball bearing 58 on the drive shaft 14 so that the ball bearing 58 fixes the axial position of the carrier 40. The largest gear 38 on the carrier 40 is in constant mesh with the smallest gear 37 on each of the three counter shafts 18. Each of the four gears (38, 42, 44 and 46) on the driven gear carrier 40 has twelve equally spaced slots in its bore for engaging a driven gear selector ring 47, which transfers torque from any selected driven gear to the driven gear carrier 40. As shown in FIG. 5, the driven gear selector ring 47 has two teeth that extend out through diametrically opposed slots in the driven gear carrier 40 and engage slots in the driven gear 38. Referring also to FIG. 3, the axial position of the driven gear selector ring 47 is controlled by a ring 48 with the cross section of an angle the radial leg of which is located on one side of the selector ring 47, and the longitudinal leg of which is located in a small annular space between the drive shaft 14 and the inside diameter of the selector ring 47. A ring 49, with a rectangular cross section, is located on the other side of the selector ring 47. A transverse pin 50 passes across the inside diameter of the driven gear carrier 40, through diametrically opposed holes in the rectangular ring 49 and the longitudinal leg of the angle ring 48, through a slot in the drive shaft 14, and through a hole in an expanded diameter end of a driven gear selector rod 54. The transverse pin 50 is held in position by a set screw in the end of the driven gear selector rod 54. The axial position on the driven gear carrier 40 of the four driven gears 38, 42, 44, and 46 is fixed by a snap ring 62 on the inboard end of the carrier 40, a short cylinder 39 which maintains separation between adjacent gears while permitting unobstructed passage of the driven gear selector ring 47 between gears, and an integral shoulder 63 on the driven gear carrier 40.

A compression spring 52 is located in the hole through the drive shaft 14 between an expanded diameter end on the driven gear selector rod 54 and the guide bushing 32. A small pitch chain 53 connects the driven gear selector rod 54 with a gear shift rod 61 with four spring pins 51 projecting out a short distance on both sides. When placed in a notch in the end of the crank arm 33 each of the spring pins 51 corresponds with the position required for the driven gear selector ring 47 to engage one of the four driven gears.

Figure 6:
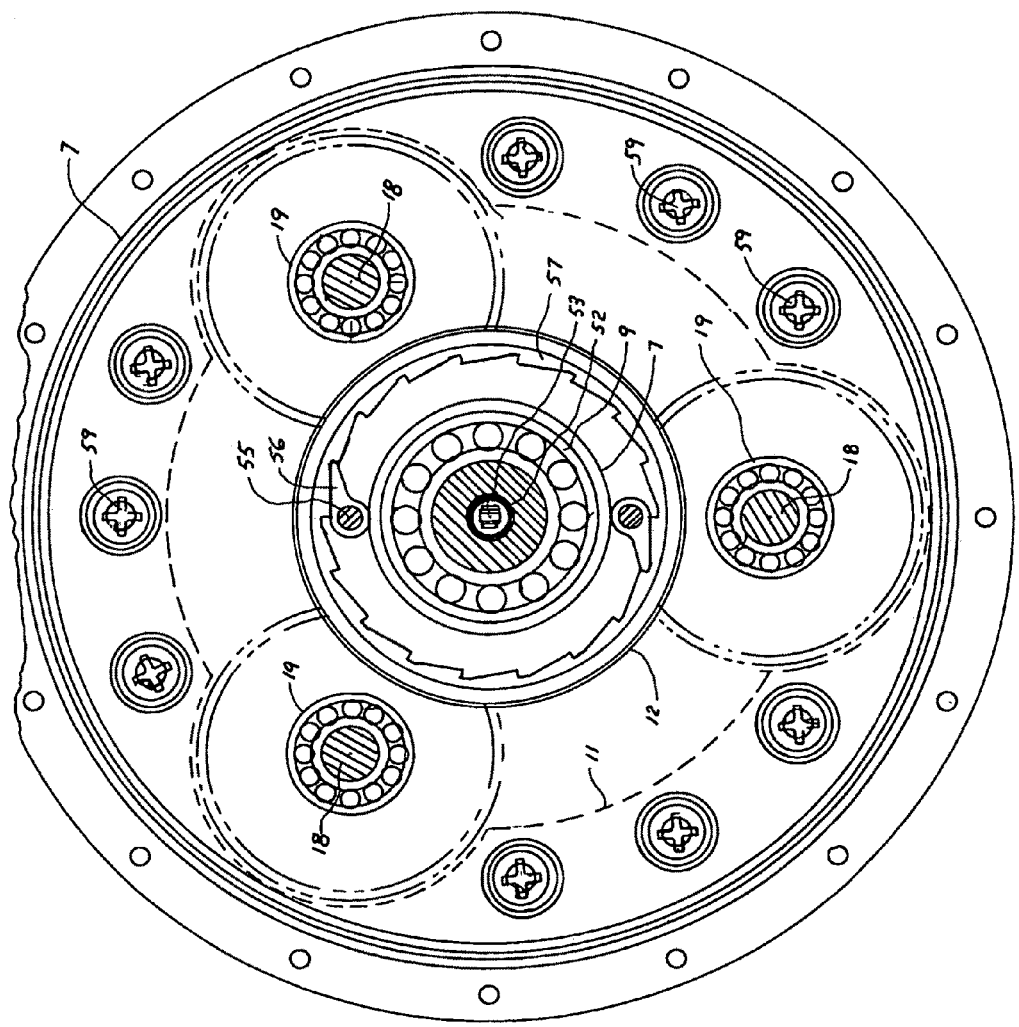
FIG. 6 is a section taken along the line 6-6

Referring to FIG. 6 as well as to FIG. 3, a pair of pawl pins 55 are press fit in the end of the driven gear carrier 40 and spring loaded pawls 56 mounted on them. A gear case closing plate 12 is attached to the gear case 11 with the screws 59 and the joint sealed with an "O" ring 60 with a sealing washer under the had of the screw 59. A ratchet ring 57 press fit in the closing plate 12 engages the pawls 56 for transferring torque from the driven gear carrier 40 to the wheel hub 7. A ball bearing type seal 13 installed in the gear case closing plate 12 prevents migration of oil from the gear case 11 to the wheel hub 7.

To illustrate an example design for a transmission according to the present invention, 16 pitch gears with a face width of ⅝ inch are used for the drive gears, 32 pitch gears with a ⅜ inch face width are used for the driven gears, and 1.875 inch is used for the distance between the drive shaft and the counter shafts. N1 is the number of teeth in the selected driver gear and N2 the number of teeth in its meshing counter shaft gear. N4 is the number of teeth in the selected driven gear and N3 is the number of teeth in its meshing counter shaft gear. The number of teeth in the selected gears and resultant transmission gear ratio, as well as the equivalent wheel diameter for a standard 26 inch diameter bicycle wheel, is presented for each transmission speed in the following table.

| Speed | N1 | N2 | N3 | N4 | Ratio | Equiv Diameter |
| --- | --- | --- | --- | --- | --- | --- |
| One | 42 | 18 | 54 | 66 | 1.908 | 49 |
| Two | 42 | 18 | 57 | 63 | 2.111 | 54.9 |
| Three | 42 | 18 | 60 | 60 | 2.333 | 60.7 |
| Four | 42 | 18 | 63 | 57 | 2.578 | 67 |
| Five | 48 | 12 | 54 | 66 | 3.272 | 85 |
| Six | 48 | 12 | 57 | 63 | 3.619 | 94 |
| Seven | 48 | 12 | 60 | 60 | 4.000 | 104 |
| Eight | 48 | 12 | 63 | 57 | 4.420 | 115 |

Figure 1:
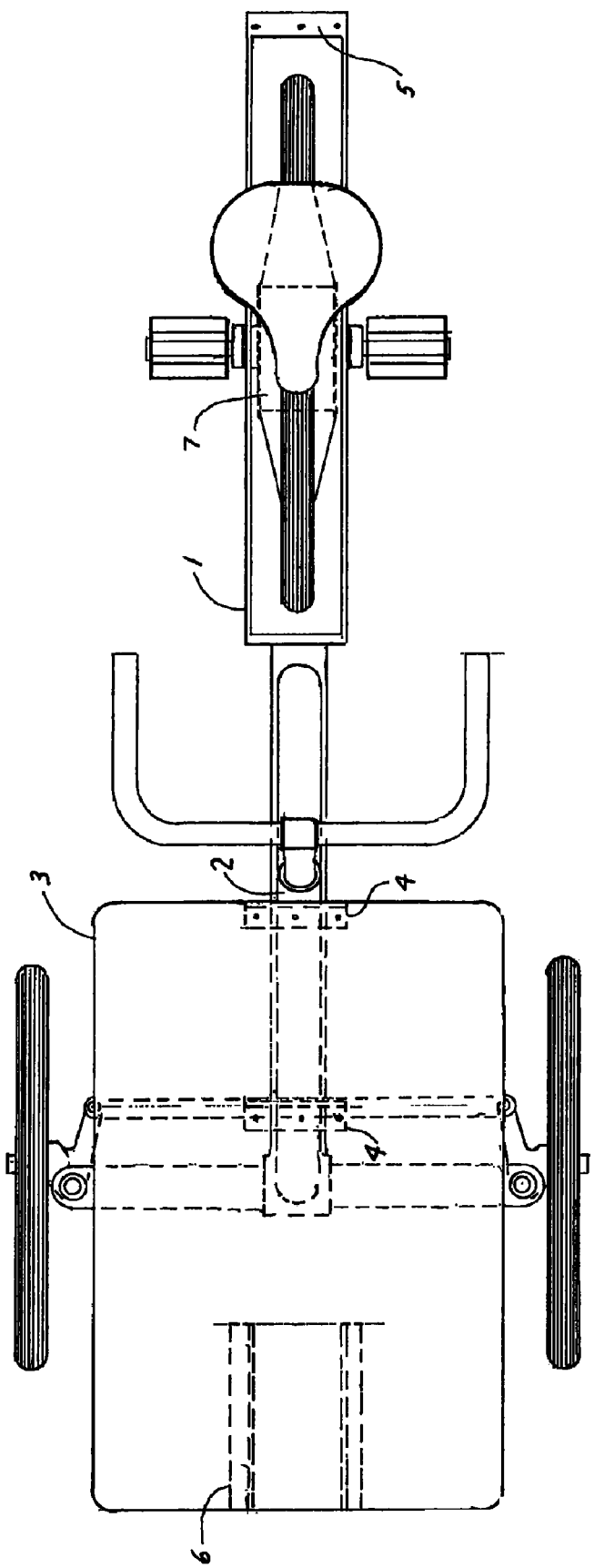
FIG. 1 is a plan view of a tricycle using the present invention.
Figure 2:
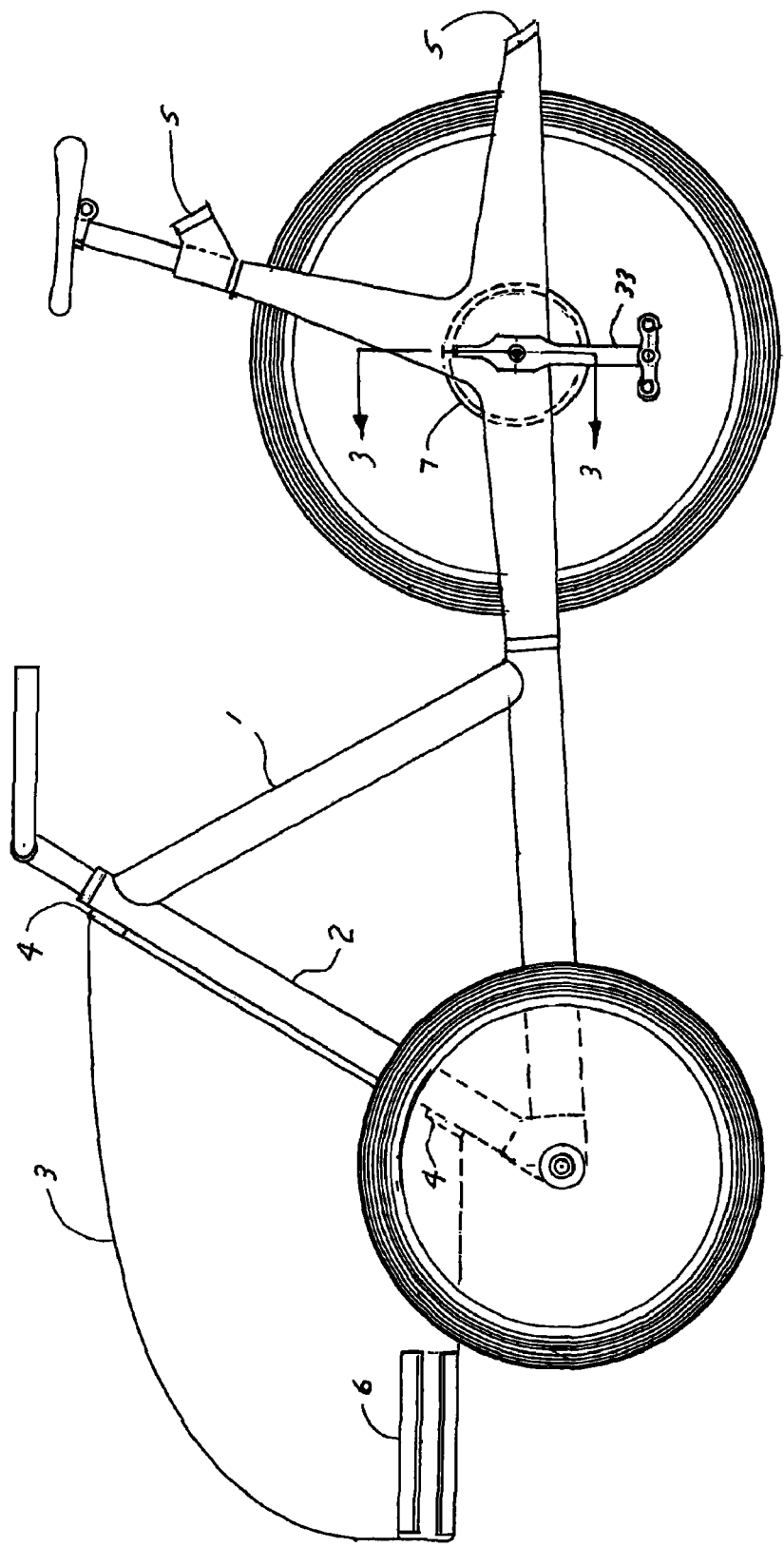
FIG. 2 is a side view of the same vehicle.

Referring to FIG. 1 and FIG. 2, power is delivered to the transmission 7 with a conventional bicycle seat and conventional bicycle pedals. A molded fiberglass trunk 3 is mounted on the forward end of the tricycle to compensate for the weight of the rider on the rear end. The trunk 3 is bolted to a pair of pads 4 which are welded to the steering column 2. The bolts are installed from inside an open trunk so that they are secure from tampering when the trunk is locked. The tricycle can be converted for delivery of power to the transmission with torque amplifying pedal beams by bolting the trunk 3 to the pads 5 welded on the rear end of the frame 1, and replacing the pedal-mounting crank arms 33 with shorter crank arms with a spindle press fit in one end. A pedal beam is rotatably mounted near its center on the spindle and a stud type cam roller is bolted on the aft end of the pedal beam. The stud type cam roller engages a short length of steel track 6 fastened to the trunk 3 and provides a downward force to compensate for the weight of the rider on the cantilevered forward end of the pedal beam. The provisions for shifting gears are the same with both options for delivering power to the transmission.

While this invention has been described in terms of a preferred embodiment, it is obvious that many variations are possible using the same basic configuration. For example, if three driver gears are used with three driven gears, a nine speed transmission results with the same total number of gears as with the preferred embodiment. If four countershafts are used, the gear tooth load is ¾ of the gear tooth load with three countershafts, but then the number of teeth in both the driver and driven gears must be divisible by four instead of three. It is therefore intended that the following appended claims be interpreted as including all such variations as fall within the true scope and spirit of the present invention.

I claim:

1. In a pedal powered tricycle including a frame, a driving wheel with a central hub with a hub closing plate, a pedal drive shaft on the axis of said wheel and mounted in bearings for concentric rotation with said hub, an improved multiple speed transmission located within a gear case within said hub and comprising: an integral extension on one end of said gear case fixed against rotation by said frame; a gear case closing plate fixed on the other end of said gear case; multiple counter shafts mounted parallel to and equally spaced around said drive shaft; one end of each of said counter shafts mounted on a ball bearing in said gear case and the other end mounted on a ball bearing in said gear case closing plate; multiple gears fixed on each of said counter shafts between said ball bearings; multiple drive gears rotating freely on said drive shaft with each of said drive gears in constant mesh with one of said multiple gears fixed on each of said multiple counter shafts; a means for selectively locking any one of said freely rotating drive gears to said drive shaft; a driven gear carrier mounted on a ball bearing on said drive shaft; multiple driven gears rotating freely on said driven gear carrier with each in constant mesh with one of said gears fixed on each of said multiple counter shafts; a means for selectively locking any one of said driven gears to said driven gear carrier; and a free-wheel ratchet means for driving said hub from said driven gear carrier; wherein said means for selectively locking any one of said freely rotating drive gears to said drive shaft includes internal teeth in the bore of said drive gears; a pair of orthogonally oriented longitudinal slots through said drive shaft; an axial hole through the center of said drive shaft; a pair of steel bars located in said orthogonally oriented slots with a tooth form on the ends of said bars for engaging said internal teeth in the bore of said drive gears; a notch in the center of each of said pair of steel bars; a small diameter hole through the center of said notch in one of said pair of steel bars and a threaded hole in the center of said notch in the other of said pair of steel bars; a drive gear selector rod located in said axial hole and clamping said pair of steel bars together; and a means for adjusting the axial position of said drive gear selector rod.

2. A transmission according to claim 1 wherein said means for selectively locking any one of said freely rotating driven gears to said driven gear carrier includes a tooth form in the bore of said driven gears; diametrically opposed slots in said driven gear carrier; a driven gear selector located inside said driven gear carrier with a tooth form on said driven gear selector projecting out through said diametrically opposed slots for engaging said internal teeth in said driven gears; and a means for adjusting the axial position of said driven gear selector.

3. A transmission according to claim 1 wherein said transmission includes a pedal crank arm fixed on each end of said drive shaft for rotating said drive shaft; a conventional bicycle pedal located on one end of said crank arm with an integral extension with a slot on the other end of said crank arm; a guide bushing threaded into both ends of said axial hole through said drive shaft; a first compression spring located in said axial hole between said drive gear selector bars and said guide bushing; a drive gear selector rod threaded into the center of said steel bars; a small pitch chain passing out through said guide bushing and connecting said drive gear selector rod with a first shift rod; and multiple transverse pins press fit in said in said first shift rod.

4. A transmission according to claim 2 wherein said means for adjusting the axial position of said driven gear selector includes a ring with a radial leg of said ring on one side of said driven gear selector and a longitudinal leg of said ring passing through the inside diameter of said driven gear selector and through the inside diameter of a rectangular ring on the other side of said driven gear selector; a driven gear selector rod with an expanded diameter on one end; a longitudinal slot through said drive shaft; a transverse pin passing through diametrically opposed holes in said rectangular ring and in said longitudinal leg and said longitudinal slot, and through a hole in said driven gear selector rod; a second compression spring located in said axial hole between said guide bushing and said expanded diameter end on said driven gear selector rod; a small pitch chain connecting said driven gear selector rod with second shift rod; and multiple transverse pins press fit in said second shift rod.

5. A transmission according to claim 1 wherein said wheel hub is seated on a bearing on said drive shaft and said wheel hub closing plate is seated on a bearing on a cylindrical extension of said gear case said drive shaft is supported on one end by a bearing seated inside said cylindrical extension of said gear case, and on the other end by a ball bearing inside a frame interface fitting.

* * * * *